United States Patent [19]

Mauer et al.

[11] 4,025,273

[45] May 24, 1977

[54] MACHINE FOR FORMING DISCRETE QUANTITIES OF MATERIAL INTO A PREDETERMINED SHAPE

[75] Inventors: James E. Mauer; Benedict DiGerlando, both of Plainfield, Ill.

[73] Assignee: Zartic Frozen Meats, Inc., Plainfield, Ill.

[22] Filed: Dec. 11, 1975

[21] Appl. No.: 639,783

[52] U.S. Cl. ............................................... 425/332
[51] Int. Cl.² .......................................... B29C 15/00
[58] Field of Search ........................... 425/332, 333

[56] References Cited

UNITED STATES PATENTS

| 793,155 | 6/1905 | Piper | 425/332 |
| 1,824,759 | 9/1931 | Bainbridge | 425/332 |
| 2,858,775 | 11/1958 | Marasso | 425/332 X |

FOREIGN PATENTS OR APPLICATIONS 124,965  10/1931  Austria ........................... 425/332

Primary Examiner—Robert L. Spicer, Jr.
Attorney, Agent, or Firm—Granger Cook, Jr.; Jerold A. Jacover

[57] ABSTRACT

A machine for uniformly forming discrete quantities of material into a predetermined shape is disclosed. The machine includes a conveyor, a plurality of stationary forming members having a predetermined cross-section, and a corresponding plurality of guiding members extending from respective ones of the forming members so that discrete quantities of material carried by the conveyor are guided under the forming members where they are uniformly formed into a predetermined shape.

2 Claims, 6 Drawing Figures

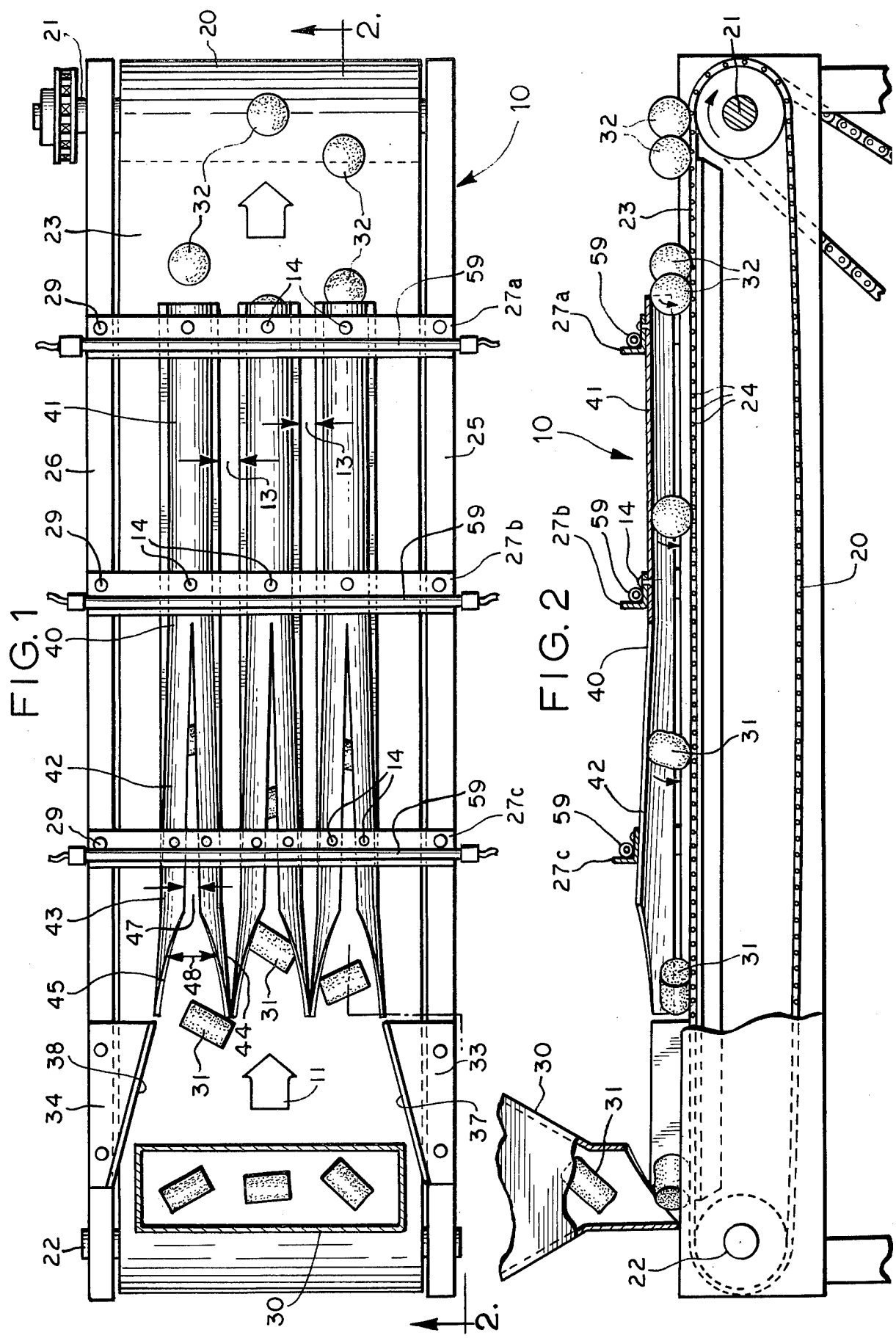

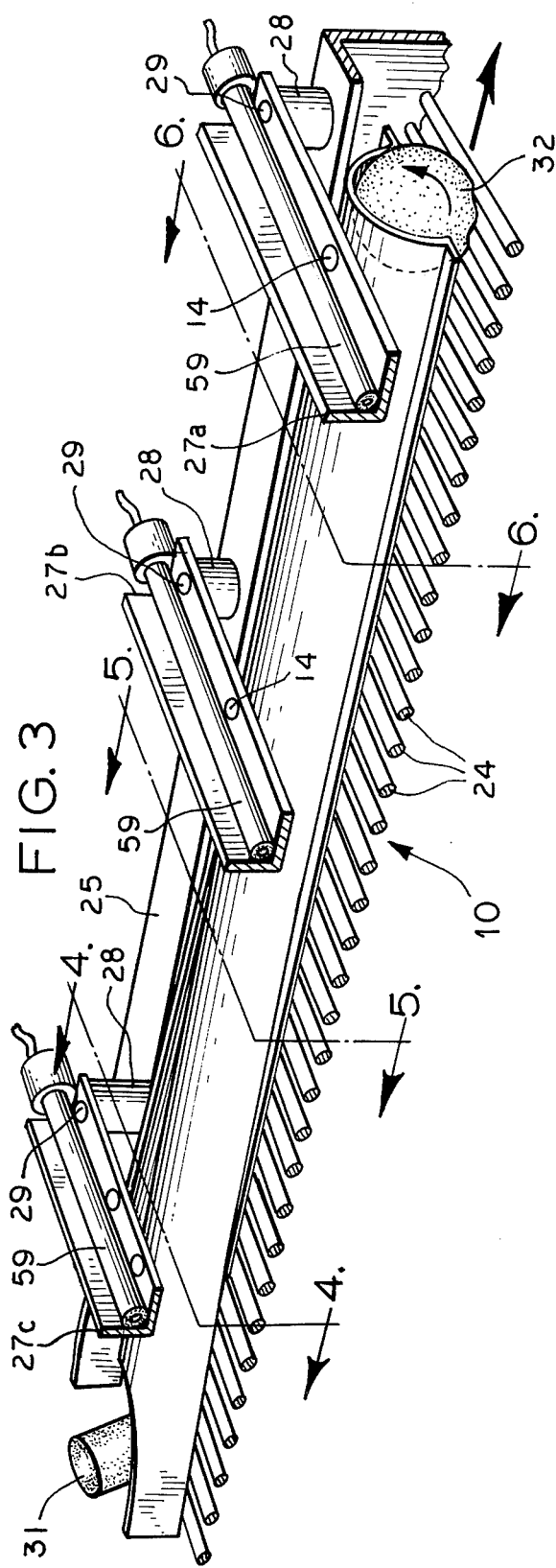
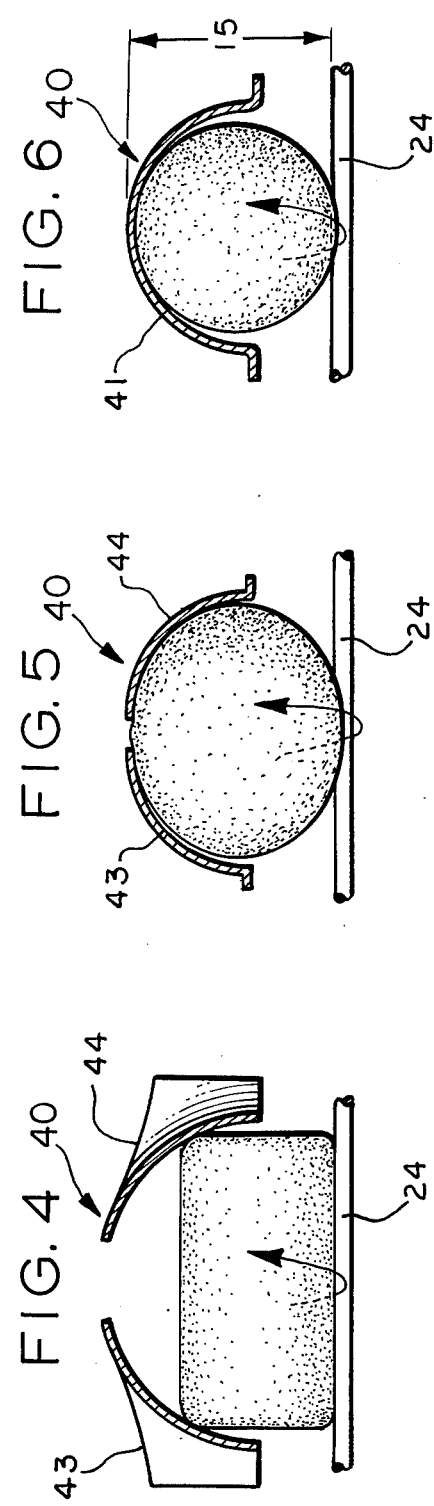

MACHINE FOR FORMING DISCRETE QUANTITIES OF MATERIAL INTO A PREDETERMINED SHAPE

BACKGROUND OF THE INVENTION

This invention generally relates to machines for forming discrete quantities of material into a predetermined shape. Such machines can be used, for example, to form slugs of dough or ground beef into a spherical shape for the mass production of leavened baked products, and meatballs, respectively.

Though the prior art discloses a number of machines capable of forming discrete quantities of material into a predetermined shape, such as a sphere, many of these machines are subject to significant drawbacks and deficiencies. For example, some of the prior art machines are incapable of continuously forming several quantities of material into a predetermined shape substantially simultaneously. As a result, the production output of these machines is relatively slow. Other prior art machines, though they may have a higher rate of production, utilize more cumbersome, and sometimes more costly apparatus. Still other machines of the prior art tend to become clogged when relatively sticky material, such as ground beef, is being formed. Consequently, such machines frequently require an undesirable amount of care, maintenance, and attention.

It is thus a primary object of this invention to provide a machine, of relatively simple construction, capable of substantially simultaneously forming a number of discrete quantities of material into a predetermined shape. It is a further object of the invention to provide a machine, of the type described, which requires minimal care, maintenance and attention, for efficiently and expeditiously forming quantities of material at a relatively rapid rate. Consistent with these objects, the machination of the invention has the additional capabilty of being arranged to form given quantities of material into a variety of sizes and shapes. Machines characterized by such simplicity, efficiency, productivity, and versatility have been unknown heretofore.

SUMMARY OF THE INVENTION

The foregoing objects are achieved in a machine comprising means for conveying discrete quantities of material in a predetermined direction, and a plurality of stationary forming means disposed a predetermined height above the conveying means. Each of the forming means extend parallely in the predetermined direction, and have a cross-section at least partially corresponding to the predetermined shape into which the discrete quantities of material are to be formed. The machine further includes a corresponding plurality of guiding means, extending from respective ones of the forming means, in a direction opposite to the predetermined direction, for guiding each of the discrete quantities of material under respective ones of the forming means.

BRIEF DESCRIPTION OF THE DRAWINGS

An exemplary embodiment of the machine summarized above is illustrated by the accompanying drawings in which:

FIG. 1 is a schematic rendering of a top view of an exemplary embodiment of the machine of the invention;

FIG. 2 is a side elevation of the machine shown in FIG. 1;

FIG. 3 is a perspective view of a portion of the machine shown in FIG. 1;

FIG. 4 is an enlarged sectional view taken along lines 4—4 of FIG. 3;

FIG. 5 is an enlarged sectional view taken along lines 5—5 of FIG. 3; and

FIG. 6 is an enlarged sectional view taken along lines 6—6 of FIG. 3.

DETAILED DESCRIPTION OF AN EXEMPLARY EMBODIMENT

To provide a better understanding of the invention, it is believed that a brief overview of the operation of the exemplary embodiment illustrated in FIGS. 1–6 would be helpful. It should be understood, however, that such an overview of operation, like the embodiment itself, is merely exemplary and should not be construed as limitative. Thus, though the machine illustrated in FIGS. 1–6 is specifically adapted to receive cylindrical slugs of ground beef and form them into a spherical shape for the mass productions of meatballs, it is emphasized that other materials could be used, and other shapes could be formed without departing from the true scope of the invention.

In operation, the cylindrical slugs of ground beef are dispensed from a hopper onto a conveyor. Aligned above the conveyor are a plurality of longitudinal members each having, at the end closest to the hopper, a guiding portion in the form of a pair of spaced arms. Comprising the other end of each longitudinal member is a forming portion having a substantially semi-circular cross-section. The spaced arms of each guiding portion serve to guide or funnel the cylindrical slugs of ground beef, transported by the conveyor, under a corresponding forming portion of the longitudinal member. When so guided, the cylindrical slug of ground beef is forced to roll about itself until it assumes a substantially spherical shape. It thus emerges from the forming portion of the longitudinal member as a ball of meat. Thereafter, the meatballs can be mixed with other ingredients, canned, or frozen for future use.

Referring now to the drawings, and in particular to FIGS. 1–3, an exemplary embodiment of the machine comprising the invention is indicated generally by reference numeral 10. Machine 10 includes a conveyor 20 comprising a surface portion 23 supported by a pair of rollers 21 and 22 for movement in a predetermined direction indicated by arrow 11 (FIG. 1). The speed of conveyor 20 can be adjustably selected by conventional means (not shown), though for the formation of meatballs in this exemplary embodiment, a speed of about 20 inches per second has been found to work satisfactorily. Surface member 23 of conveyor 20 is preferably comprised of a plurality of parallely spaced, stainless steel wire members 24, extending transversely to the direction of movement of conveyor 20.

Located above conveyor 20, at the end thereof nearest roller 22, is a hopper 30. Hopper 30 is adapted to drop discrete quantities of material onto surface 23 of conveyor 20 for transport thereby in the direction indicated by arrow 11 of FIG. 1. Though, in accordance with the present invention, hopper 30 may drop discrete quantities of material of different sizes and types, in this exemplary embodiment hopper 30 is specifically adapted to stamp out cylindrical slugs 31 of ground beef, for subsequent formation into meatballs in a manner explained in greater detail hereinafter. Hopper 30 may take the form of any commercially available apparatus.

Extending substantially along the entire length of conveyor 20 are a pair of rigid, stationary side members 25 and 26, preferably fabricated from aluminum, or some similar material. Respectively aligned with side members 25, 26 are a pair of end members 33, 34 located at the end of conveyor 20 near roller 22. Each end member 33, 34 has a biased side 37, 38, respectively, which prevents slugs of material from falling off surface 23 of conveyor 20, and which also aids in guiding the slugs of material toward appropriate longitudinal members where they are formed into a predetermined shape in a manner explained in greater detail hereinafter.

Mounted transversely to the side members 25 and 26 are a number of stationary support bars 27a, 27b and 27c, preferably fabricated from aluminum. Support bars 27 are secured a predetermined distance above surface 23 of conveyor 20 in any suitable way, such as by the selection of appropriately dimensioned spacers 28 inserted between the top surface of side members 25, 26 and the bottom surface of support bars 27. In this exemplary embodiment, support bars 27 and spacers 28 are affixed to side members 25, 26 in desired relation through means of fasteners 29. Since, for reasons that will become more apparent hereinafter, it is desired that the support bar 27c closest to roller 20 be elevated higher above surface 23 of conveyor 20 than the other support bars 27a and 27b, the spacers 28 supporting support bar 27c have a somewhat greater height than the spacers 28 supporting support bars 27a and 27b.

Machine 10 further incldues a plurality of stationary longitudinal members 40 preferably fabricated from stainless steel. Each longitudinal member 40 includes forming means comprising a forming portion 41 and integral guiding means comprising a guiding portion 42. Each forming portion 41 extends parallel to the movement of conveyor 20 as indicated by arrow 11 in FIG. 1, and is spaced from adjacent forming portions at substantially equal distances as shown by the distance indicated by the reference numeral 13. The cross-section of each forming portion 41 at least partially corresponds to the shape into which discrete quantities of material, transported by conveyor 20, are to be formed. Thus, in this exemplary embodiment, the cross-section of each forming portion 41 has a curved contour, specifically semi-circular, corresponding to the spherical shape into which the cylindrical slugs of ground beef are intended to be formed.

Each guiding portion 42 extends from a respective forming portion 41 in a direction opposite that of the predetermined movement of conveyor 20. As shown best in FIG. 3, the guiding portions 42, as they extend from their respective forming portions 41, rise to a slightly higher elevation above surface 23 to accommodate slugs 31. This is accomplished by securing the distal end 45 of guiding portions 41 to support bar 27c which is elevated somewhat higher above conveyor 20 than support bars 27a and 27b. As shown best in FIG. 1, the distal end 45 of each guiding portion 42 is flared to form a pair of guide arms 43, 44. Arms 43, 44 are separated by a gap which becomes increasingly wider along the direction opposite to the motion of conveyor 20. Thus, the gap defined by the distance indicated by reference numeral 48 in FIG. 1 is substantially wider than the gap defined by the distance indicated by reference numeral 47.

Longitudinal members 40 can be secured a predetermined distance above surface 23 of conveyor 20 with flared ends 45 of guiding portions 42 slightly higher than forming portions 41 by any suitable means. In this exemplary embodiment, a plurality of fasteners 14 are used to secure longitudinal members 40 to support bars 27. Since the height of support bars 27 above surface 23 of conveyor 20 is predetermined by the size of spacers 28, the height of the forming portion 41 and guiding portion 42 of each longitudinal member 40 above surface 23 is also so determined. In this exemplary embodiment, the size of spacers 28 is chosen so that the height of each forming portion 41, as defined by the distance indicated by reference numeral 15 in FIG. 6, is substantially equal to the diameter of the sphere into which slugs 31 are to be formed.

To prevent the discrete quantities of material formed by machine 10 from undesirably adhering to longitudinal members 40, and perhaps clogging the machine and retarding production, longitudinal members 40 are heated by means such as a heating element which may be in the form of a cal rod 59 supported by one or more of support bars 27. The cal rods 59 may be used to heat longitudinal members 40 directly, or by conduction through support bars 27, to any desired temperature by connecting cal rods 59 through a circuit (not shown) including a thermostat. Since fat associated with beef or other proteinaceous foods will generally melt at temperatures below 130° F., longitudinal members 40 are heated to approximately 130+ F. in this exemplary embodiment. Continuously melting fat in the manner described not only promotes production, but minimizes the care, maintenance and attention required of machine 10.

In accordance with the foregoing explanation, the operation of machine 10 can now be described. In particular, discrete quantities of material are dispensed from hopper 30 onto surface 23 of conveyor 20. Though in this exemplary embodiment the material comprises cylindrical slugs 31 of ground beef, it should be clear that the slugs could be of virtually any shape. Further, though ground beef is used in this embodiment, other proteinaceous material, dough, or the like, could be used.

Though the cylindrical slugs 31 are dropped from hopper 30 onto surface 23 of conveyor 20 in a somewhat random manner, they are promptly conveyed in the direction indicated by arrow 11 of FIG. 1 toward the flared distal ends 45 of guiding portions 42 of longitudinal members 40. Because of their flared shape, distal ends 45 guide or funnel slugs 31 between a corresponding pair of arms 43, 44 — the height of slugs 31 being accommodated by the slightly elevated distal end 45 of guiding portion 42. As shown in FIG. 2, conveyor 20 soon brings each slug 31 into contact with longitudinal member 40, causing the slug 31 to roll about itself in a counterclockwise direction looking at FIG. 2. To promote this rolling action, circumferential grooves (not shown) may be formed in the interior surface of the longitudinal members 40, particularly in forming portions 41.

As slug 31 enters the forming portion 41 of longitudinal member 40, it is urged into a spherical shape by the semi-circular cross-section of the forming portion 41. Accordingly, upon emerging from the forming portion 41, the slug 31 is transformed into a sphere 32. This transformation is further illustrated by the sequence of FIGS. 4–6.

Though the exemplary embodiment herein described is preferred, many other embodiments which do not part from the true scope of the invention may be devised by those skilled in the art. All such embodiments are intended to be covered by the appended claims.

We claim:

1. A machine for uniformly forming each of discrete quantities of proteinaceous material into a spherical shape, comprising:

means,, including a movable surface, for conveying said discrete quantities of material in a predetermined direction;

a plurality of substantially equally spaced, longitudinal members each having a forming portion of substantially semi-circular cross-section, and an integral guiding portion, in advance of said forming portion, having a transversely flared end for assisting in guiding said discrete quantities of said material toward said forming portion; said flared end comprising a pair of guide arms separated by a gap which becomes increasingly wider in the direction opposite said predetermined direction to accommodate said discrete quantities of material of varying widths; and support means for maintaining said plurality of longitudinal members in substantially parallel relation above said movable surface, with each of said guide arms extending substantially opposite said predetermined direction; said support means including means for independently elevating said forming portions and said guiding portions so that said guiding portions can be elevated above said forming portions to accommodate said discrete quantities of material of varying heights.

2. The machine defined in claim 1 further includes means mounted by said support means, for heating said longitudinal members, to prevent said discrete quantities of said material from adhering thereto.

* * * * *